Figure 1:
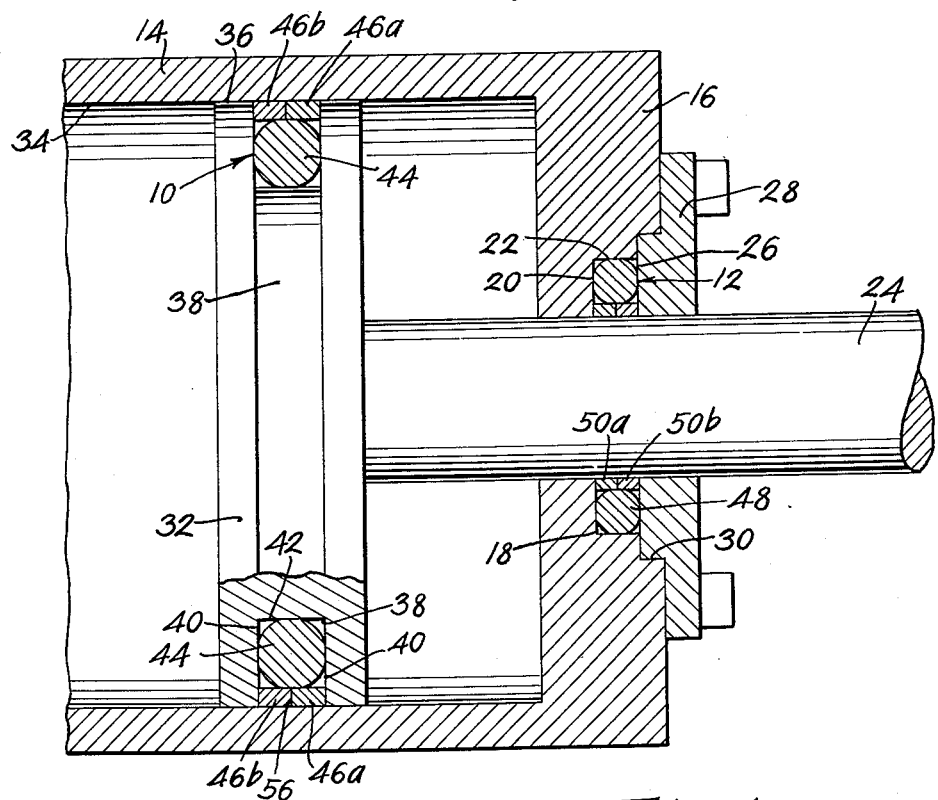

Dec. 11, 1962 C. W. TYDEMAN 3,068,018
HIGH PRESSURE FLUID SEAL
Filed July 7, 1958

INVENTOR.
CLARENCE W. TYDEMAN
BY
ATTORNEY

United States Patent Office 3,068,018
Patented Dec. 11, 1962

3,068,018
HIGH PRESSURE FLUID SEAL
Clarence W. Tydeman, Redwood City, Calif., assignor to Tydeman Machine Works, Inc., Redwood City, Calif., a corporation of California
Filed July 7, 1958, Ser. No. 747,090
5 Claims. (Cl. 277—165)

This invention relates to high pressure fluid seals for dynamic installations of a type which include an O-ring and a split metal band positioned in an annular groove between two relatively movable mating parts.

A seal of the type to which this invention relates forms the subject matter of my copending application Serial Number 534,284 filed September 14, 1955, now abandoned, of which this application is a continuation-in-part. The aforementioned application discloses a construction wherein the O-ring is of a diameter less than the width of the groove in which it is mounted and the metal ring or band is bias-cut so that it can be contracted or expanded for insertion between the O-ring and the adjacent relatively movable surface. Earlier patented high pressure fluid seals of this same general type were used within grooves having a rounded bottom and the split metal ring or band was formed with a step-cut joint.

It has now been found, however, that while the aforementioned forms of the high pressure seal are suitable for a wide variety of general applications, they both have much to be desired in certain specific instances. For example, small diameter piston and shaft seals utilizing metal sealing rings of the step-cut variety become extremely difficult to expand or contract to the degree required for insertion into the groove. In addition, both the step-cut and bias-cut forms of the metal ring are a practical impossibility to machine in small diameters especially from the hardened steel that is required for short-stroke pistons which are difficult to keep lubricated. Most important, however, is the fact that neither of the foregoing metal sealing ring constructions can be machined to the close tolerances necessary for high pressure application to prevent excessive fluid leakage past the joint.

It is, therefore, the principal object of the present invention to provide an improved high pressure fluid seal including an O-ring and a pair of matched metal rings cooperating for use between two mating and relatively movable parts.

A second object is to provide a seal of the type described in which the O-ring is compressed between the sidewalls of the groove, the bottom thereof and the pair of split metal rings.

A third object is the provision of a high pressure fluid seal wherein an O-ring cooperates with a pair of matched split metal rings to seal the annular joint therebetween when placed in side-by-side relation.

A fourth object is to provide an O-ring and split metal ring seal of a type especially adapted for use on small diameter pistons and shafts.

A fifth object of the present invention is the provision of a high pressure fluid seal that includes a pair of metal split rings which can be formed from hardened steel and lapped to close tolerances by conventional machining techniques.

Another object of the invention is to provide a seal for dynamic installations that consists of an O-ring and a pair of matched split metal rings encircling the O-ring with the joints therein located in substantially diametrically opposed relation.

Additional objects of the invention are to provide a high pressure fluid seal which is simple to manufacture and install, one that is extremely effective in preventing oil from leaking around or through it, and one that is capable of withstanding considerable abuse with a minimum of lubrication without appreciable wear.

Figure 2:
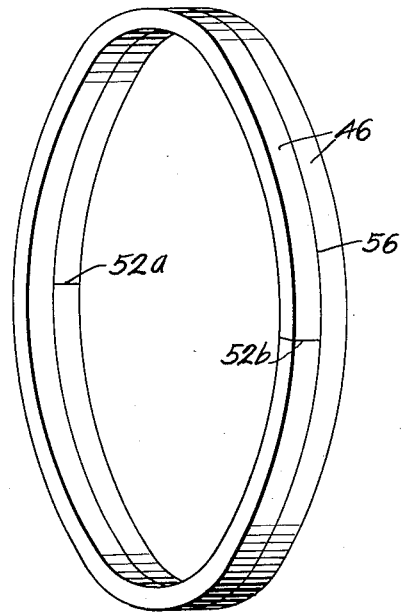

Other objects will be in part apparent and in part pointed out specifically hereinafter in connection with the description of the drawing that follows, and in which:

FIGURE 1 is a fragmentary diametrical section showing a piston, cylinder and piston rod in which the high pressure fluid seal of the present invention is used between all of the relatively movable surfaces thereof; and, FIGURE 2 is a perspective view showing the pair of matched split metal rings which form a part of the seal with their joints arranged in diametrically opposed relation.

Referring now to the drawing, and in particular to FIGURE 1 thereof, it will be seen that the high pressure fluid seal of the present invention has been illustrated in two different forms, namely, a piston seal designated generally by numeral 10 and a shaft seal similarly identified by numeral 12. For purposes of illustration, a cylinder 14 having an integral head 16 formed on one end thereof and an axial opening therethrough has been shown. The head includes an annular recess 18 surrounding the axial opening and shaped to receive the shaft seal 12 by providing a planar inner sidewall 20 and an adjoining outer circumferential wall 22. The piston rod 24 provides the inner circumferential wall of groove 18 and is mounted for reciprocal movement through the axial opening in the head 16. The outer sidewall 26 of groove 18 is also planar and formed by the inside surface of end plate 28 bolted or otherwise attached to the head 16 of the cylinder. End plate 28 also includes an axial opening therethrough sized to pass the piston rod 24 for reciprocating movement. In the particular form shown, both the end plate and cylinder head are formed to provide interlocking annular shoulders 30 that function to align the axial openings in these two elements.

The inner end of the piston rod 24 is connected to a piston 32 which slides freely along the cylindrical cylinder wall 34 imparting reciprocating motion to the rod in accordance with conventional practice. The mating cylindrical surface 36 of the piston is formed to contain an annular groove 38 having spaced substantially parallel and planar sidewalls 40 and an adjoining circumferential inner wall or bottom wall 42. The outer circumferential wall of groove 38 is, of course, the relatively movable cylinder wall 34. Thus, the grooves 18 and 38 into which the seals 10 and 12, respectively, are inserted are both generally rectangular in cross section with the radial distance between the inner and outer circumferential walls thereof being slightly greater than the transverse distance between the spaced parallel sidewalls.

The seals 10 and 12 each include an elastic O-ring and a pair of identical matched split metal rings. For purposes of identification, the O-ring of the piston seal 10 has been designated by numeral 44; whereas, the pair of metal rings used therewith are identified by 46a and 46b. Similarly, in shaft seal 12, the O-ring is shown as 48 and the metal rings as 50a and 50b. The O-rings 44 and 48 are each preferably circular in cross section while the metal rings 46 and 50 are preferably rectangular. The diameter of the O-rings is also slightly greater than the width of their respective grooves so that they are slightly compressed between the sidewalls thereof as shown in FIGURE 1. The combined widths of each pair of metal rings, on the other hand, is slightly less than the distance between the sidewalls of the groove so that they can be placed therein in side-by-side relation. The diameter of the O-rings coupled with the thickness of the metal rings used therewith is slightly greater than the radial distance between the circumferential walls of the groove so that said O-rings are also compressed radially as well as transversely. Therefore, in both seals 10 and 12, the radial compression of the elastic O-rings 44 and 48 which are restrained against transverse expansion by the sidewalls of the groove acts to urge the pairs of metal rings into fluid-tight sealed contact with the adjacent relatively movable surface. In the case of piston seal 10, the fact that the O-ring 44 is compressed between the identical matched pair of split metal rings 46 and the inner circumferential wall 42 of groove 38 causes said metal rings to expand into sealed contact with the cylinder wall 34. Similarly in seal 12, the radial compression of O-ring 48 between the outer circumferential wall 22 of groove 18 and the pair of split metal rings 50 results in said metal rings being contracted into fluid-tight sealed contact with piston rod 24.

In FIGURE 2 of the drawing, one pair of the identical matched split metal rings 46 have been illustrated apart from the O-ring. Each ring includes a transverse cut 52 formed substantially perpendicular to the opposite planar faces 54 thereof. This, of course, is the simplest and most inexpensive split ring construction and when fabricating rings of small diameter from hardened steel, it is the only practical form, the bias or step-cut designs being much less desirable if not impossible to make in this way. The rings when formed of hardened spring steel can be honed and polished to close tolerances and the mating faces which form the annular seam or joint 56 therebetween are preferably lapped to provide a substantially fluid-tight seal. In use, the transverse cuts 52a and 52b are located substantially diametrically opposite one another as shown so that any fluid leaking through one of said cuts will have to flow approximately half way around the annular joint 56 before it can pass on to the other side through the other of said cuts. In actual tests of this seal under pressures of approximately 1,000 p.s.i. and using rings of a diameter considerably less than one inch, it was found that leakage past the piston was less than a drop a minute. Hardened steel rings also enable the seal to be used effectively in installations where the stroke of the piston is so short as to prevent adequate lubrication thereof.

Again, briefly referring to FIGURE 1, it will be seen that the line of tangency between the O-ring and pair of split metal rings is coincident with the annular joint 56 between said metal rings. This, of course, effectively prevents oil from leaking past the seal between the O-ring and metal ring elements thereof. Also, the annular seals formed between the O-rings and the sides and bottom of the grooves, cooperate to block the passage of oil underneath the O-rings.

Having thus described the several useful and novel features of the high pressure fluid seal of the present invention, it will be seen that the several useful objects for which it was designed have been achieved. Although but a single specific form of the invention has been illustrated and described in connection with the accompanying drawings, I realize that certain changes and modifications therein may be made by those skilled in the art within the broad teaching hereof; hence, it is my intention that the scope of protection afforded hereby shall be limited only insofar as said limitations are expressly set forth in the appended claims.

What is claimed is:

1. A high pressure fluid seal for use between relatively movable mating parts, one of which contains an annular groove having a bottom and spaced sidewalls which comprises, a pair of split metal rings arranged in side-by-side relation between the sidewalls of the groove and in spaced relation to the base thereof, the splits in said rings being positioned in diametrically opposed relation, and a continuous elastic ring compressed within the groove in continuous annular contact with the base and both sidewalls thereof and with both metal rings in a manner to seal the annular joint therebetween.

2. The seal as set forth in claim 1 in which the elastic ring has a substantially circular cross section.

3. The seal as set forth in claim 1 in which the splits in the metal rings comprise transverse cuts substantially parallel to the axis of said rings and the ends of the rings forming the splits lie in intimate abutting relation.

4. The seal as set forth in claim 1 in which the adjoining faces of the pair of metal rings are planar and lapped to mate with a substantially fluid tight seal.

5. The seal as set forth in claim 1 in which the elastic ring is substantially circular in cross section and both metal rings are substantially rectangular in cross section, and in which the radial distance between the bottom of the groove and the adjacent surface of the other relatively movable part is less than the combined diameter of the elastic ring and thickness of the metal rings.

References Cited in the file of this patent

UNITED STATES PATENTS

| | | |
|---|---|---|
| 1,424,655 | Kurtz | Aug. 1, 1922 |
| 2,509,672 | Christensen | May 30, 1950 |
| 2,607,644 | Smith | Aug. 19, 1952 |
| 2,784,013 | Groen | Mar. 5, 1957 |